US010015531B1

(12) United States Patent
Chenillo

(10) Patent No.: US 10,015,531 B1
(45) Date of Patent: Jul. 3, 2018

(54) OCCLUSIONLESS METHOD FOR VIRTUAL IMAGE INSERTION

(71) Applicant: Samuel Chenillo, New York, NY (US)

(72) Inventor: Samuel Chenillo, New York, NY (US)

( * ) Notice: Subject to any disclaimer, the term of this patent is extended or adjusted under 35 U.S.C. 154(b) by 0 days.

(21) Appl. No.: 15/821,915

(22) Filed: Nov. 24, 2017

Related U.S. Application Data

(60) Provisional application No. 62/509,744, filed on May 23, 2017.

(51) Int. Cl.
| | |
|---|---|
| *H04N 5/93* | (2006.01) |
| *G11B 27/00* | (2006.01) |
| *H04N 21/234* | (2011.01) |
| *G11B 27/036* | (2006.01) |
| *H04N 21/81* | (2011.01) |
| *H04N 21/2187* | (2011.01) |
| *G06T 13/80* | (2011.01) |

(52) U.S. Cl.
CPC ....... *H04N 21/23424* (2013.01); *G06T 13/80* (2013.01); *G11B 27/036* (2013.01); *H04N 21/2187* (2013.01); *H04N 21/23418* (2013.01); *H04N 21/8146* (2013.01)

(58) Field of Classification Search
None
See application file for complete search history.

(56) References Cited

U.S. PATENT DOCUMENTS

| | | |
|---|---|---|
| 3,961,133 A | 6/1976 | Bennett |
| 4,100,569 A | 7/1978 | Vlahos |
| 5,953,076 A * | 9/1999 | Astle ...................... G06T 7/246 348/580 |
| 6,750,919 B1 * | 6/2004 | Rosser .................. H04N 5/272 348/584 |
| 2008/0189215 A1 * | 8/2008 | Travez .................. G06Q 30/02 705/80 |

* cited by examiner

*Primary Examiner* — Heather Jones
(74) *Attorney, Agent, or Firm* — r.r (princeton); Roy Rosser

(57) ABSTRACT

A system and method of occlusionless virtual insertion is disclosed that uses an animation of the image. The animation has a full image frame, a null frame, and a number of intervening video frames. When the animation is run, the image appears to be physically moved behind an edge of the animation video frames. An event video-stream is duplicated, and the duplicate delayed to provide a delayed event video-stream. The animation, stopped at the full image frame, is mixed into the delayed event video-stream steam at a selected location using video match moving algorithms. The resultant video-stream is broadcast. The un-delayed, event video-stream is monitored in the region corresponding to where the virtual insertion is occurring in the delayed event video-stream. When this corresponding region begins to become occluded by a foreground object, the animation is triggered. As the time delay of the delayed event video-stream equals the time it takes the animation to run from the full image frame to the null frame, when the foreground object moves into the insertion region in the delayed event video-stream there is no inserted image to occlude it. To the viewer, it appears as if the image is on a movable sign, and just happened to be translated out of view before the object of interest moved into the region.

14 Claims, 4 Drawing Sheets

OCCLUSIONLESS METHOD FOR VIRTUAL IMAGE INSERTION

CROSS-REFERENCE TO RELATED APPLICATIONS

This application claims priority to U.S. Ser. No. 62/509,744 filed on May 27, 2017, the contents of which are hereby fully incorporated herein by reference.

BACKGROUND OF THE INVENTION

(1) Field of the Invention

The invention relates to the manipulation of television and multimedia content, and more particularly to enhancing the process of inserting virtual video images by obviating the need for either a green screen in the original scene, or complex occlusion computing algorithms, to enable occlusion processing.

(2) Description of the Related Art

The technical problem of avoiding the occlusion of foreground objects by inserted images is inherent in the technical field of virtual video insertion.

Virtual video insertion is a technology widely used in, for instance, television sports broadcasting, both for the purpose of advertising and for the insertion of production enhancing graphics. The technology uses match moving methodology to make images that are placed into video-streams in post-production look as if they were at the scene of the event at the time the video was shot. The match moving algorithms adjust the image to main the correct size and orientation with respect to the image as the recording camera is panned, tilted and zoomed.

In addition to the match moving, a further requirement in maintaining the illusion, or perception by the viewer, that the image, or graphic, being virtually inserted is actually a part of the event, is ensuring that objects that cross in front of the virtual images are not obscured, or occluded, by the inserted image.

Traditionally this occlusion management has been accomplished by either color-keying or advanced video image processing. Color keying, widely used in both television weather broadcasts and in the film industry in merging actors with computer rendered scenery, requires the physical placement of green or blue screens at the event. This necessitates having an actual blue or green screen at the correct location at the event. This requires prior planning as well as permissions from stadiums. Using advanced video image processing for occlusion management requires very sophisticated color background monitoring and processing that in turn requires using expensive computer technology.

What is needed is a low cost method of performing virtual insertions that does not require physical equipment at the event site, or the use of high cost graphics computers to process the video being produced.

The relevant prior art includes:

U.S. Pat. No. 3,961,133 issued to Bennett on Jun. 1, 1976 entitled "Method and apparatus for combining video images with proper occlusion" that describes how an image generated by a television camera is combined with an image generated from digitally stored information to form a composite scene wherein objects appearing in either image properly occlude one another with respect to the eyepoint from which the scene is viewed. This is accomplished by processing the camera video signal to provide pulses for each raster line which indicate the starting and stopping points of an object viewed by the camera. At the same time, the camera video signal is provided on a delay line to a video switch which also receives the digitally generated video signal. The switch is controlled by logic circuitry in accordance with the established occlusion priority to pass to the video display device the proper signal from either the camera or the image generator.

U.S. Pat. No. 4,100,569 issued to Vlahos on Jul. 11, 1978 entitled "Comprehensive electronic compositing system" that describes a system for combining foreground video images with background video images, using the so-called "blue-screen" (or special background color) technique, a comprehensive control system is provided which accommodates a broader range of foreground objects, permits the careful coordination of control of the blue of the foreground with the level of the background signals, and also permits precise shadow control in accordance with the artistic requirements of the scene to be produced.

U.S. Pat. No. 5,953,076 issued to Astle et al. on Sep. 14, 1999 entitled "System and method of real time insertions into video using adaptive occlusion with a synthetic reference image" that describes a system and method for realtime occlusion processing for seamlessly and realistically blending an inserted image such as an advertisement into a region of a live broadcast image without obscuring the action of the live image. The average color and intensity of a synthetic reference image containing at least some of the region to be replaced is compared to the average color and intensity of the current live broadcast image to determine the difference between the two images. The resulting difference image obtained from processing the current image and synthetic, reference image determines areas of the intended insertion region within the current image which are obscured by live action. The processor then generates an occlusion mask based on the difference image and only those pixels that are unoccluded within the intended insertion region are allowed to be inserted into the live broadcast.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive system and method of occlusionless virtual insertion is disclosed.

When placing virtual images into televised events, the illusion that the image is actually a part of the event may be aided by ensuring that foreground objects that cross in front of background objects, are not obscured, or occluded, by the inserted image. Traditionally such occlusion management has been accomplished by either color-keying, which requires the physical placement of green or blue screens at the event, or by using sophisticated color background monitoring using elaborate and expensive computer technology.

The occusionless method of virtual insertion of this invention, instead, maintains the illusion of an image being at the event by using an animation of the image to be inserted. The animation is constructed such that, when it is run, it produces the appearance of the inserted image being physically moved behind some structure at the event. With careful timing of when the animation is run, the image can be made to appear to be physically moved out of the way before there is a need for occlusion management. With the method of the present invention, conventional occlusion processing is no longer necessary. The simplicity and flexibility of the present invention allows virtual insertion to be done at many locations within an event video-stream, and on pre-recorded as well as live video-streams.

The animation used in the present invention may include two or more animation video frames, one of which may be a full image frame and one of which is a null frame. The full image frame may, for instance, show the image in its entirety. The null frame may be an animation frame that is entirely transparent, or reduced in size so as to be unnoticeable. In a preferred embodiment, the animation may have a number of intervening video frames arranged such that when the animation is run starting with the full image frame, and ending with the null frame, the image appears to be physically moved behind an edge of the animation video frames.

The occlusionless virtual insertion may be implemented by first duplicating the event video-stream. The duplicated event video-stream may then be delayed to provide a delayed event video-stream. A first region in the delayed event video-stream may be selected as a suitable site into which the image may be inserted. The animation, stopped at the full image frame, may be mixed into the delayed event video-stream steam at the selected location. Well-known video match moving, blending or mixing technology may be used so that the inserted animation appears be an integral part of the event location. The resultant, combined match moved animation and delayed event video-stream may then be broadcast or streamed to an audience.

The un-delayed, event video-stream may then be monitored in the region corresponding to where the virtual insertion may be occurring in the delayed event video-stream. When this corresponding region begins to become occluded by a foreground object of interest, such as a player in a game, the animation may be triggered in the delayed event video-stream. As long as the time delay of the delayed event video-stream is equal to, or exceeds, the time it takes the animation to run from the full image frame to the null frame, there may be no inserted image to occlude the object of interest when that moves into the insertion region in the delayed event video-stream. To the viewer, it may appear as if the inserted image is on a movable sign at the stadium, and that it just happened to be being changed and therefore, translated out of view before the object of interest moved into the region.

The monitoring of the insertion region in the un-delayed event video-stream, and the triggering of the video may be done by an operator, or one, or both, of the actions may be done by a suitably programmed computer.

When the foreground object moves out of the region in the un-delayed event video-stream, the animation may be run in reverse, so that by the time the region is no longer occluded in the delayed event video-stream, the virtual insertion of the image may once again be seen in the delayed version of the event video-stream being broadcast to an audience.

Therefore, the present invention succeeds in conferring the following, and others not mentioned, desirable and useful benefits and objectives.

It is an object of the present invention to provide a flexible, and low cost, system and method for performing virtual insertion for streamed or broadcast visual representations of events.

It is another object of the present invention to provide a virtual insertion system that may be run by semi-skilled operators, or which may be partly, or totally, automated.

It is a further object of the present invention to allow virtual insertions to be performed on event video-streams at locations remote from the event.

It is yet a further object of the present invention to allow virtual insertions to be performed on repeat broadcasts of event video-streams.

DETAILED DESCRIPTION OF THE INVENTION

Figure 1:
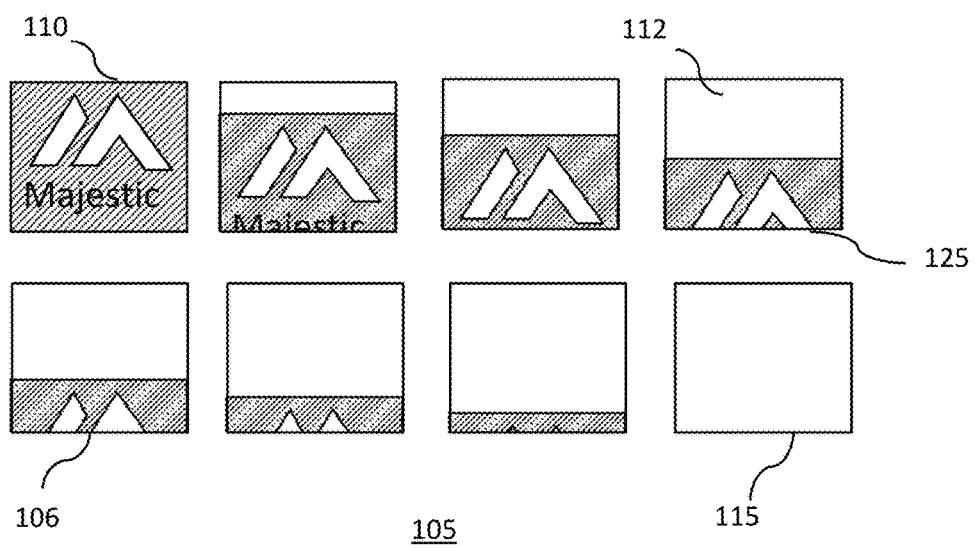
FIG. 1 shows a schematic view of an animation of an image of one embodiment of the present invention.

The preferred embodiments of the present invention will now be described in more detail with reference to the drawings in which identical elements in the various figures are, as far as possible, identified with the same reference numerals. These embodiments are provided by way of explanation of the present invention, which is not, however, intended to be limited thereto. Those of ordinary skill in the art may appreciate upon reading the present specification and viewing the present drawings that various modifications and variations may be made thereto without departing from the spirit of the invention.

FIG. 1 shows a schematic view of an animation of an image of one embodiment of the present invention.

The animation 105 of an image may, for instance, include a full image frame 110 and a null frame 115. There may then be one or more animation video frame 106 that may be intermediate frames. The intermediate animation video frames 106 may, for instance, have a transparent portion 112. The frames may be created and arranged such that when the animation is played from the full image frame 110 to the null frame 115, the appearance to a viewer is of the image being moved away behind an edge 125 of the animation video frames. In this way, to a viewer, it may, depending on the placement of the amination, appear that the sign in in the stadium, but is on a sliding board that is being moved behind an object at the event. In alternate embodiments of the animation, it may, for instance, appear to rotate out of view, in the manner of rotating signage that is common at many sporting events.

A transparent portion of an intermediate image animation frame 112 may be used to create the effect of the sign being moved, or the animation may contain frames that are successively smaller in size until the null frame is effectively no insertion.

Figure 2A:
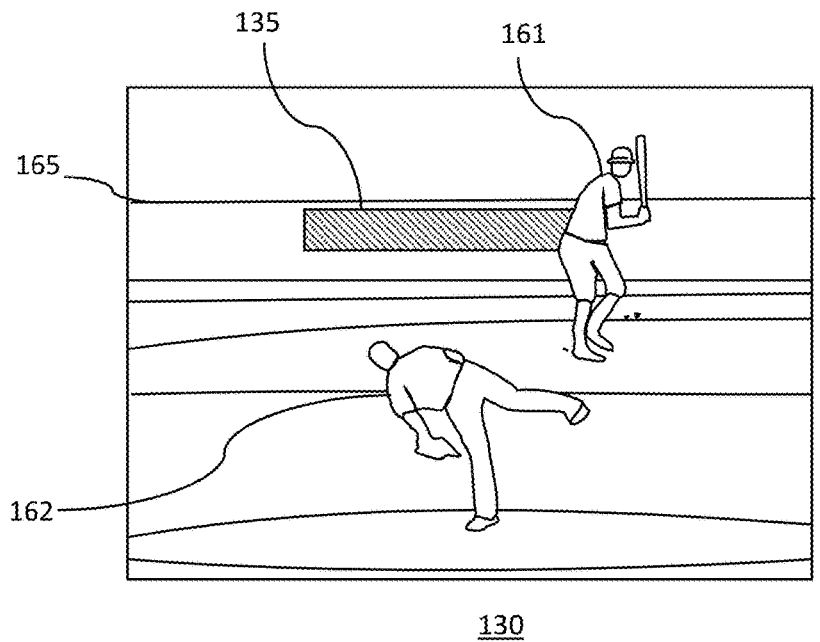
FIG. 2A shows a schematic view of an event video-stream.

FIG. 2A shows a schematic view of an event video-stream. The schematic of FIG. 2A is intended to show a pitcher in a televised baseball game pitching a ball to a batter. One of ordinary skill in the art will, however, appreciate that inventive concepts described herein may be applied to a wide variety of other sporting or non-sporting events.

The event video-stream 130 shown in FIG. 2 includes two, primary foreground objects: a first person 161, in this instance the baseball batter, and a second person 162, in this instance the baseball pitcher. There are also background objects that include a wall behind home plate 165 and a green, occlusion screen 135 placed on the wall.

Figure 2B:
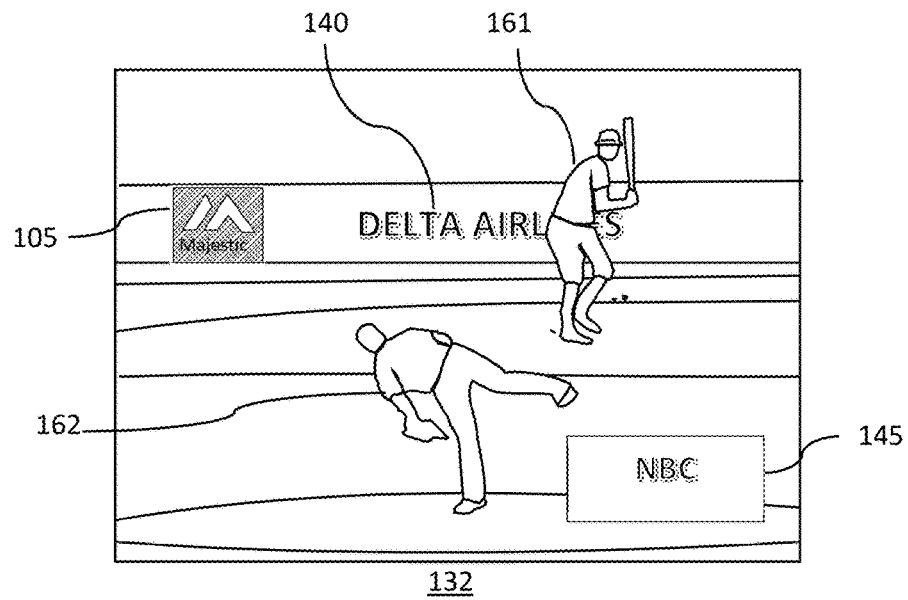
FIG. 2B shows a schematic view of delayed, event video-stream.

FIG. 2B shows a schematic view of delayed, event video-stream. This may, for instance, be a duplicate copy of the event video-stream 130 shown in FIG. 2, that may have been delayed in time by a predetermined time and subject to video processing by, for instance, suitably programmed image processing computers. In addition to the event participants, in this instance the first person 161 that may be a baseball batter, and the second person 162 that may be a baseball pitcher, the delayed, event video-stream 132 may now contain an animation 105 of an image as well as a conventionally inserted virtual image 140 and a conventional static keyed graphic 145.

The conventionally inserted virtual image 140 may use conventional blue-screen technology for occlusion, while the animation 105 of an image may not depend on any conventional occlusion processing. Both may, however, use well-known match-moving technology to make the inserted image appear to be a part of the actual event being televised. Such technology is described in detail in, for instance, U.S. Pat. No. 5,264,933 issued to Rosser, et al. on Nov. 23, 1993 entitled "Television displays having selected inserted indicia" the contents of which are hereby incorporated by reference in their entirety. The conventional static keyed graphic 145 may, however, not be linked to the video scene being shown, but may be statically located with respect to the display.

Figure 3:
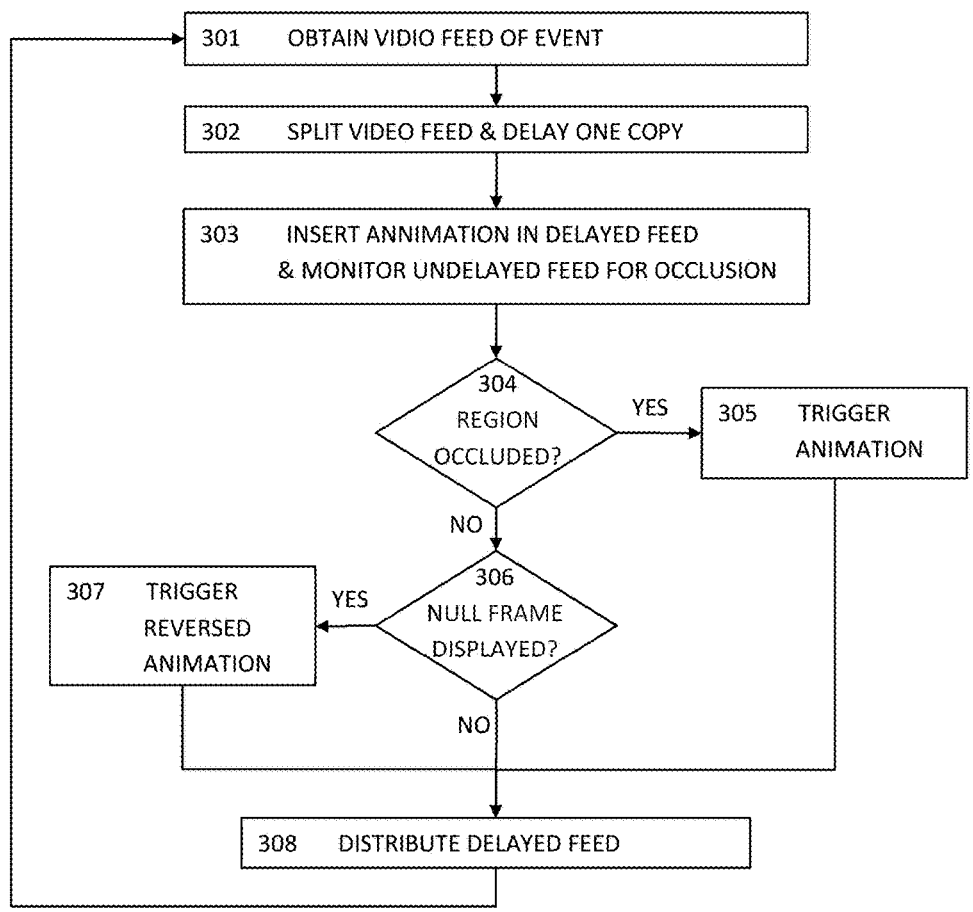
FIG. 3 is a schematic flow diagram illustrating some of the steps of one embodiment of the present invention.

FIG. 3 is a schematic flow diagram illustrating some of the steps of one embodiment of the present invention.

In Step 301: OBTAIN VIDIO FEED OF EVENT, an event video-stream may be obtained. The event video-stream may be of a live event, or it may be computer generated or pre-recorded, or some combination thereof. The event itself may be something such as, but not limited to, a sporting event, a musical concert, an interactive game, a political rally or a staged performance, or some combination thereof. The event video-stream may be a succession of audio-visual components, including graphics. These components may be digital or analogue, and may be any suitable video, graphic or audio format. Suitable formats include, but are not limited to, a video file format such as AVI (Audio Video Interleave), FLV (Flash Video Format), WMV (Windows Media Video), MOV (Apple QuickTime Movie) or MP4 (Moving Pictures Expert Group 4); an analog television format such as NTSC, PAL, or SECAM; a digital television (DTV) format, such as ATSC, DVB, ISDB or DTMB, or some combination thereof. The event video-stream may be captured, or created, using any suitable means such as, but not limited to, broadcast, or other quality, digital or analogue, still or video cameras, computer generation or some combination thereof.

In Step 302: SPLIT VIDEO FEED & DELAY ONE COPY the event video-stream may first be duplicated, and then one copy delayed by a suitable time delay to create the delayed event video-stream. If the event video-stream is in a digital form, or has been converted to a digital form, the delay may be accomplished by, for instance, storing the video images in a sequence of digital memory devices.

Step 303 INSERT ANNIMATION IN DELAYED FEED & MONITOR UNDELAYED FEED FOR OCCLUSION. In this step, the animation containing the virtual image may be mixed in with the delayed event video-stream at a selected, or predetermined, location within the frames, or fields, of the event video-stream. The region in which the virtual insertion of the animation may be made may be unoccluded by any of the foreground objects at the time of insertion. For instance, in an event video-stream depicting a sporting event, the actual players, and any implements they may be using to participate. may be the foreground objects, while the field on which they may be playing, or the stadium in which they the event may be occurring, including spectators, may be the background objects.

The mixing of the animation with the delayed event video-stream may utilize well-known match moving technology so that the image of the inserted animation changes in size, shape and orientation that match the corresponding change in the delayed event video-stream, thereby creating the appearance that the image is actually a part of the event represented by the event video-stream.

Concurrent with the mixing of the animation in the delayed event video-stream, the undelayed copy of the event video-stream, i.e., what may have been the originally obtained event video-stream, may be monitored for occlusion within a corresponding region to that where the virtual insertion is taking place within the delayed version. The reason for this monitoring is so that as soon as occlusion begins to occur in what will be the insertion region, the image animation may be triggered. In this manner, if the image animation runs through to the null frame in a time that is less than, or equal to the delay of the delayed event video-stream, by the time the insertion region becomes occluded in the delayed event video-stream, there may be no inserted image to occlude the foreground object. Instead, it may appear to a view of the delayed event video-stream that the inserted image was coincidently moved out view before the foreground object arrived within the insertion region.

In Step: 304 REGION OCCLUDED? a decision may be made as to whether or not occlusion may be occurring in the region in the event video-stream that corresponds to the insertion region in the delayed event video-stream. This decision may be based on monitoring of the appropriate portion of the event video-stream.

The monitoring may be done by an operator viewing the event video-stream, or it may be performed automatically by a suitably programmed computer. A digital image processor may, for instance, be programmed to perform an analysis of the pixel color values within the occlusion region in which the animation is currently being inserted. The digital image processor may also analyze pixels in the corresponding region in the undelayed event video-stream. If the pixel values are sufficiently different, a decision may be made to trigger the animation.

The analysis may, for instance, consist of looking at the difference in pixel value of corresponding pixels. The difference in pixel values may, for instance, be calculated by a mathematical algorithm such as, but not limited to, the total sum of the pixel values, the average value of all the pixels, the sum or average of one or more of the R, G, B pixel components taken separately or together, or some combination thereof. The decision may be made if the sum of all, or the average of all, the pixels within the region exceed a predetermined threshold, or the value may be displayed for an operator to make a decision. The calculation may be being performed in parallel on both images, and the decision may be made as soon as the there is a sufficient difference in the pixel values being considered, as this may reduce computational overhead and may also allow extra time for the animation to run from full frame to the null frame.

In a preferred embodiment, the occlusion observation may be done by an operator who may also trigger the start of the animation as this may represent the most flexible and possibly cost efficient way of implementing the invention. Such an operator may also be able to vary the speed at which the animation runs. This may allow different length animations may be run, or the timing of the animation may be varied slightly depending on which part of the insertion region is being occluded. For instance, it may be more impactful if the image is still partly in view when the foreground object arrives in the insertion region. This may be possible if the foreground object is only going to occlude a portion of the insertion that may be in the transparent portions of intermediate frame after a certain stage of the animation. The animation may then be slowed to allow this to occur, i.e., the foreground object may pass over the top of the lower half of the image as it is being withdrawn down.

In a further preferred embodiment of the invention, the monitoring for occlusion may be performed by a suitably programmed image processor, or general purpose digital processor. As described above, the processing may be performed as an algorithm operating on the pixel values within the region of insertion. This comparison may between pixels of two concurrent images in the undelayed event video-stream, or it may be between an image in the undelayed stream and the image in the delayed event video-stream in which virtual insertion may currently be occurring. The comparison may run concurrently on both images and be displayed as a gradually changing number or graphic. In that way, an operator may trigger the animation as soon as a predetermined value is reached. For instance, as soon as the difference in the sum of corresponding pixels exceeds a predetermined threshold, which may be a percentage of the total such as, but not limited to, a 5% or 10% or 15%, the operator may trigger the animation to run. The difference may also be an absolute value and may be displayed as changing color graphic or as a gauge, so that there is a color range, or a gauge position at which point insertion may be triggered by the operator. The operator may also, or instead, be altered to when occlusion has been detected by an audio signal.

In a further implementation, triggering of the animation may be performed automatically be the suitably programmed computer when the pixel value reaches or exceeds a predetermined trigger threshold.

Step 305: TRIGGER ANIMATION. When there is a determination that the region in which the image animation is inserted may be come inserted in a predetermined number of video frames, the image animation may be triggered to run from the full image frame to the null frame. Triggering the animation may be performed by an operator acting on his own observation of the undelayed event video-stream, or by an operator acting on information supplied by an automated monitoring of the insertion region in both the delayed and undelayed event video-stream. Alternately, triggering, or initiating the running, of the animated image insertion may be performed automatically by the programmed computer based on its automatic determination of a sufficient pixel difference to indicate occlusion in the insertion region.

In Step 304, the determination may be made that there is no occlusion. The system may then proceed to Step 306 NULL FRAME DISPLAYED? In this step, the system may check to see what frame of the image animation is currently being displayed on the delayed event video-stream. In particular, if the null frame is being displayed, the inference may be that the image was taken out of display previously because occlusion was imminent, but now the occlusion event has passed, and it may be time to redisplay the image. On detecting the null image on display, either by the operator making the observation, or by the automatic determination by the computer, the system may then proceed to Step 307 TRIGGER REVERSED ANIMATION.

Triggering the reversed animation may run the animation from the null frame back to the full image frame. However, the animation may not be triggered to run immediately an unoccluded frame is detected while a null frame is being displayed. Before triggering the reverse animation, the system may first wait until a sufficient number of unoccluded frames have occurred since the last occluded frame. The system may, for instance, begin counting the unoccluded frames, and when enough frames, or time, has elapsed, then triggering the start of the reverse animation. The number of frames that the system delays should be equal to, or greater than the number of frames in the image animation, or the time taken for it to run the animation from the null frame back to the full image frame.

From each of Steps 305, 306 and 307, the system may then proceed to Step 308: DISTRIBUTE DELAYED FEED. In this step, the next image in the delayed event video-stream may then be sent on toward an end viewer. This may, for instance, take the form of a next image as part of a streaming video distribution over a network such as the Internet, or it may take the form of a next video frame in a television broadcast, or some combination thereof.

The system may then loop back to step 301 and continue the task of obtaining and processing an event video-stream.

Figure 4A:
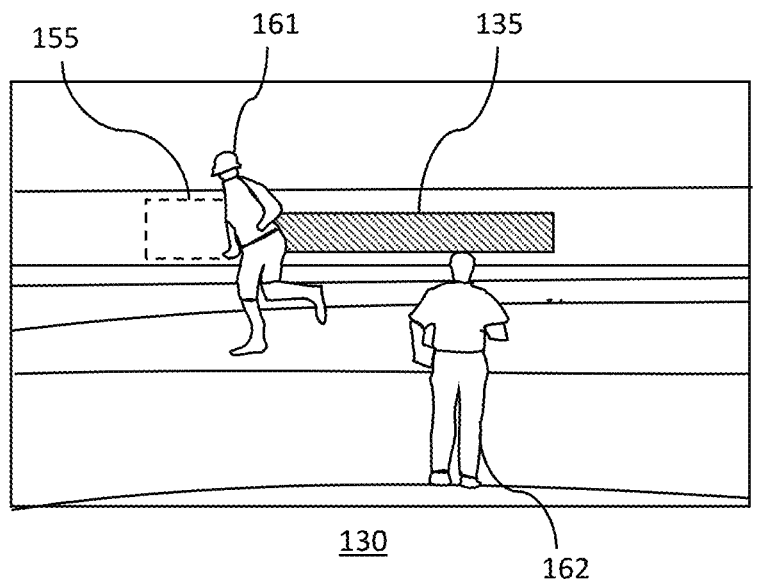
FIG. 4A shows a further schematic view of an event video-stream.

FIG. 4A shows a further schematic view of an event video-stream.

FIG. 4A shows a frame from an event video-stream 130 intended to depict a base-ball game being televised. The foreground objects may be a first person 161, that may be a baseball batter, and a second person 162, that may be a baseball pitcher. The scene of FIG. 4A is intended to show a batter who may be trotting to first base from home plate. In doing so, the first person 161 may be in front of a green, occlusion screen 135 located on a wall behind home plate. The player is also passing in front of, or occluding, a region 155 that corresponds to the region in which a virtual insertion of an image animation was being made in a delayed version of the event video-stream, as depicted in FIG. 2B.

Figure 4B:
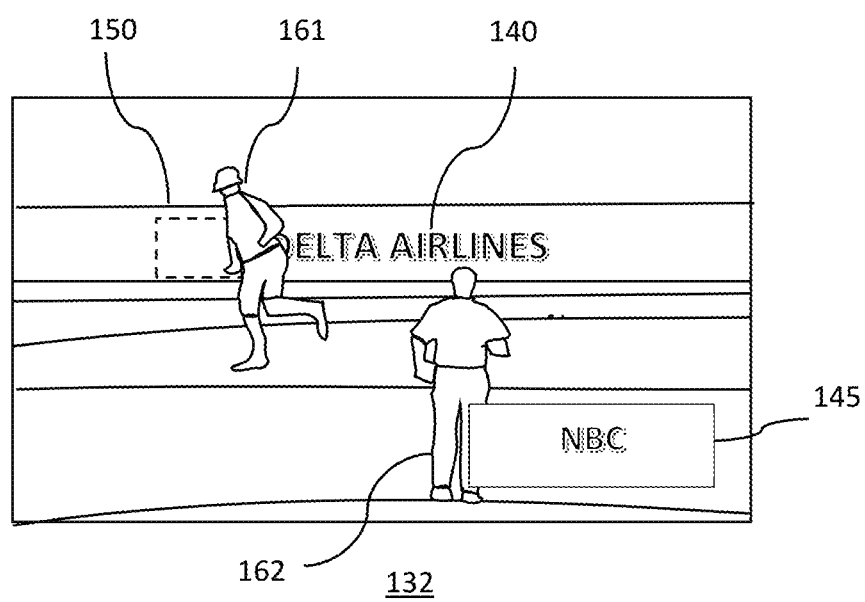
FIG. 4B shows a further schematic view of delayed, event video-stream.

FIG. 4B shows a further schematic view of delayed, event video-stream.

FIG. 4B is intended to show a delayed, event video-stream 132 that is a duplicate copy of the event video-stream shown in FIG. 4A, but which has been delayed by a predetermined time, or number of video frames, during which time image processing on the video may have occured.

In FIG. 4B, a conventionally inserted virtual image 140 has been placed on the wall behind home plate, and may appear to be actually at the venue because the first person 161, or foreground object, correctly occludes the conventionally inserted virtual image 140. This may be done using conventional color-screen technology because of the green, occlusion screen that is actually on the stadium back wall.

In FIG. 4B there is, however, no virtual insertion of the image in the region 150 that was in FIG. 2A. More exactly, the null, or transparent frame, of the that animation is now being displayed. As it is either totally transparent, or sized to be too small to be visible the viewer, there is no need for occlusion processing. The null frame is being displayed because, when occasion in the corresponding region was detected in the corresponding frame of the undelayed, event video-stream, the image animation may have been triggered to run from the full frame image depicted in FIG. 2B to display the null frame by the time the first person 161 began occluding the insertion region. By having the animation make the image appear to being slide down behind the bottom of the back wall, the viewer may assume that the image is on a movable, or rotating display, that may have been coincidently being changed, or moved out of view. In that manner, the animation may appear to the viewer to be a part of a display system that is actually at the venue.

FIG. 4B also shows a conventional static keyed graphic 145. This may be a conventional burn such as routinely used by broadcasters for displaying information. Such graphics are typically static with respect to the viewing screen and are not intended to be a part of the event being displayed. As seen in FIG. 4B, such graphics occlude both foreground objects, such as second person 162, and background objects, such as playing field.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. An occlusionless method for the virtual insertion of an image, comprising:
    providing an animation of said image, said animation comprising two or more animation video frames including a full image frame, and a null frame, and wherein, when said animation is run starting with said full image frame, and ending with said null frame, said image appears to be physically moved out of view behind an edge of said animation video frames;
    providing an event video-stream;
    duplicating said event video-stream to provide a duplicate event video-stream;
    delaying said duplicate event video stream by a predetermined time to provide a delayed event video-stream;
    virtually inserting said animation into an insertion region of said delayed event video-stream, said insertion region being unoccluded, and said animation being stopped to display said full image frame;
    monitoring said event video-stream to detect when a current region corresponding to said insertion region becomes occluded; and,
    when said current region becomes occluded, triggering said animation, thereby having said null frame being displayed in said delayed event video-stream when said insertion region becomes occluded in said delayed video stream.

2. The method of claim 1 wherein said animation includes one or more animation video frames having a transparent portion.

3. The method of claim 1, wherein, said predetermined time is equal to, or greater than, a time taken for said animation to run from said full image frame to said null frame.

4. The method of claim 3, wherein, said monitoring said event video-stream for occlusion of said current region, and said triggering said animation are performed by a human operator.

5. The method of claim 3, wherein, said monitoring of said event video-stream for occlusion of said current region is performed automatically by a suitably programmed computer.

6. The method of claim 5, wherein, said automatic monitoring comprises comparing values of one or more pixels within said current region in a current frame of said event video-stream with values of corresponding pixels within said insertion region of said delayed, event video-stream.

7. The method of claim 5, wherein, said automatic monitoring comprises automatically comparing values of one or more pixels within said current region in a current frame of said event video-stream with values of corresponding pixels of a corresponding region in a preceding frame of said event video-stream.

8. The method of claim 5 wherein said triggering of said animation is performed by a human operator.

9. The method of claim 5 wherein said triggering of said animation is performed automatically by a computer.

10. The method of claim 9, wherein, said triggering is performed automatically if said comparison of pixel values reveals a difference indicative of a change of aggregate pixel values of 10% or more.

11. The method of claim 2, wherein, said animation is run at a second, slower speed, such that said animation takes longer than said predetermined time to run from said full image frame to said null frame, and an intermediate video frame is displayed when said occlusion of said insertion region occurs.

12. The method of claim 1, further comprising, triggering said animation to run in reverse if, in subsequent monitoring, said corresponding region is deemed to have been unoccluded, and said null frame displayed, for a time longer than said predetermined time.

13. The method of claim 1, wherein, said event video-stream is a live event video-stream.

14. A system for the occlusionless, virtual insertion of an image, comprising:
    an animation of said image, said animation comprising two or more animation video frames including a full image frame, and a null frame, and wherein, when said animation is run starting with said full image frame, and ending with said null frame, said image appears to be physically moved out of view behind an edge of said animation video frames;
    an event video-stream;
    a duplicate event video-stream produced by duplicating said event video-stream;
    a delayed event video-stream produced by delaying said duplicate event video stream by a predetermined time;
    a digital processing device, programmed to:
        use match moving algorithms to virtually insert said animation into an insertion region of said delayed event video-stream, said insertion region being unoccluded, and said animation being stopped to display said full image frame;
        to monitor said event video-stream to detect when a current region corresponding to said insertion region becomes occluded; and,
        to trigger said animation when said current region becomes occluded, thereby having said null frame being displayed in said delayed event video-stream when said insertion region becomes occluded in said delayed video stream.

\* \* \* \* \*